July 16, 1957 B. HARRIS ET AL 2,799,784

PHASE COMPARISON SYSTEM

Filed April 1, 1954

INVENTORS
Bernard Harris &
Albert Macovski
BY [signature]
ATTORNEY 2,799,784

PHASE COMPARISON SYSTEM

Bernard Harris, Bronx, and Albert Macovski, Massapequa, N. Y., assignors to Radio Corporation of America, a corporation of Delaware Application April 1, 1954, Serial No. 420,292

5 Claims. (Cl. 307—88.5)

The present invention relates to improvements in electrical phase detection and phase comparison circuits, and more particularly, although not necessarily exclusively, to electrical phase comparison circuits of the balanced variety embodying a semiconductor amplifier device connected for a substantially symmetrical type of operation.

More directly, the present invention relates to improvements in electrical phase comparison circuits involving semiconductor amplifier devices of the type disclosed and claimed in a copending United States patent application, by George C. Sziklai, Serial No. 320,712, filed November 15, 1952, entitled "Phase Comparison," and especially such improvements as lend operating stability and temperature change immunity thereto.

As described in the above-identified Sziklai application, there are many instances, particularly in electrical signaling systems, where there is a need for a phase comparing circuit capable of detecting the sense and magnitude of phase difference between two electrical signals. In one common type of phase comparison circuit, a local controllable wave is compared in phase with a standard or fixed reference wave to develop a control signal which may be applied to control the generation of the local wave so as to bring it into synchronous frequency or phase relationship with the standard reference wave. Examples of this type of circuit action may be seen in automatic frequency control systems used for synchronizing the line deflection circuits in television receivers, a commercial embodiment of such a circuit being illustrated in an article by E. L. Clark, entitled "Automatic frequency phase control of television sweep circuits" in the May 1949 issue of "Proceedings of the I. R. E.," commencing on page 497.

Phase comparison circuits, of course, find many other applications, such as in the automatic frequency control of the local oscillator in a superheterodyne receiver, such that otherwise undesirable shifts in the local oscillator frequency due to line voltage changes, etc., may be avoided.

Prior to the disclosure of the above-identified Sziklai U. S. patent application, a most common form of phase comparison circuit involved the use of two diodes connected in a bridge relation across one source of signal to be compared. The other signal to be compared was in turn fed across the other diagonal of the bridge. The difference in phase between the two signals thus compared was manifested in a change in the average signal current flow through one branch of the bridge which could be detected and employed for control purposes. Sziklai then contributed to the art by teaching how a bidirectional semiconductor amplifier could be employed to accomplish with very little circuitry what was theretofore possible through the use of at least two separate diode elements and other circuit complexities. By using a semiconductor amplifier device having substantially symmetrical output and input characteristics whereby the roles of the input and output electrodes in junction relation to a base electrode can be interchanged with no practical change in circuit operating conditions, Sziklai shows that one signal to be compared may be applied to the base electrode of the transistor while the other signal to be compared may be applied across the other two electrodes. Direct current flow between these latter two electrodes is then shown to be a measure of the phase difference between the signals to be compared with the electrical sense of the average current flow bearing information as to the sense of the phase difference between the signals.

In the application of the Sziklai semiconductor balanced phase comparator circuit to television receiving circuits, it is expedient to apply received television synchronizing pulses to the semiconductor amplifier base electrode and locally developed deflection signal across the other two electrodes. By capacitively coupling the synchronizing signal to the base electrode, the semiconductor amplifier may be made to develop its own cutoff bias so that the amplifier is effectively switched or keyed "on" only during the intervals of the synchronizing pulses. In this way, the developed phase indicating signal results from sampling of the deflection signal by the synchronizing signal.

Under the conditions where the semiconductor amplifier is subject to wide variations of temperature, circuit operation may be adversely affected. This comes about by reason of the well known change in the barrier conditions within a semiconductor amplifier as the temperature of the semiconductor material is altered. For example, the terminal impedance between the emitter and collector of a semiconductor amplifier or the "comitters" of a bidirectional semiconductor amplifier during cutoff of the amplifier is an inverse function of temperature. As brought out more fully hereinafter, "comitters" is a term applied to the operating electrodes of a bidirectional semiconductor amplifier device. This terminal impedance during cutoff is sometimes referred to as the "reverse" or "back" impedance of the amplifier. In the above-described Sziklai phase comparator circuit, this back impedance will have a tendency to dissipate some of the error voltage developed by the phase comparator circuit. Since the actual value of the back impedance is a function of temperature, the developed phase comparison error voltage will also undesirably be rendered a function of temperature. Moreover, the back terminal resistance of transistor amplifier operating at a given temperature varies considerably from unit to unit. Thus, with the basic Sziklai circuit, it is important that care be exercised in replacing the semiconductor amplifier should replacement become necessary.

To improve the temperature stability of this type of phase comparator semiconductor circuit, and to render its operation less critical as to the characteristics of the semiconductor amplifier used, the present invention provides a resistor having a value falling within a narrow range of resistance values and connected between the committers of the bidirectional semiconductor amplifiers described above. In accordance with the present invention, the value of this resistor is made relatively low compared to the lowest reverse impedance value presented by the semiconductor amplifier (corresponding to the highest operating temperature) while maintaining the value of the resistor sufficiently high to develop a peak error voltage in response to current flow between the committers large enough to provide adequate frequency control of a wave generator.

It is, therefore, an object of the present invention to provide an improved phase comparison apparatus.

Another object of the present invention is to provide simplified apparatus for accurately detecting phase differences between electrical waves applied thereto.

A further object of the present invention is to provide an improved system for indicating the magnitude and senses of a phase difference conditionally existing between two electrical signals.

Yet another object of the present invention is to provide an improved phase comparison apparatus embodying a semiconductor amplifier device.

It is further a general object of the present invention to provide an improvement on the phase comparator circuit disclosed in copending U. S. patent application, Serial No. 320,712, filed November 15, 1952, by George C. Sziklai, entitled "Phase Comparison."

Still another object of the present invention resides in the provision of a novel semiconductor balanced phase comparator circuit which is substantially free from changes in operating characteristics over relatively wide variations in ambient temperature.

It is yet another object of the present invention to provide a transistorized automatic frequency control circuit suitable for use in television cathode ray beam deflection circuits in which successful operation of the circuit is permitted for a variety of transistor units having considerably different operating characteristics.

A more complete understanding of the present invention as well as other advantages and features thereof will be obtained from a reading of the following specification, especially when taken in connection with the accompanying drawings, in which.

Figure 1:
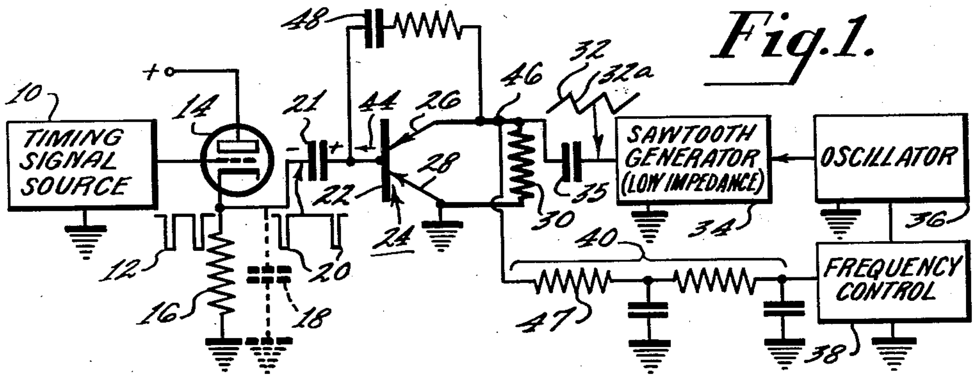
Figure 1 is a block and schematic representation of an automatic frequency control system embodying the novel features of the present invention.

Turning now to Figure 1, there is illustrated in block form at 10 a source of standard timing signal having a waveform shown at 12. As will become more apparent hereinafter, although the timing signal 12 has been shown as being pulselike in form, the successful practice of the present invention is in no way limited to this particular wave configuration. The timing signal 12 is conveyed to the control electrode of an amplifier 14 which, by way of example, has been shown as being of the cathode follower variety with an output load resistor 16 connected between the cathode of tube 14 and circuit ground. Stray and/or lumped circuit capacitance which may appear across the load resistor 16 is indicated by the dotted line capacitor 18. The purpose of the cathode follower tube 14, as discussed hereinafter, is to ensure a relatively low impedance source of timing signal for the phase comparator circuit to be described. The timing signal as delivered by the cathode follower has been indicated by the waveform 20.

Means such as the capacitor 21 are then provided for coupling the timing signal 20 to the base electrode 22 of a semiconductor amplifier 24. The semiconductor amplifier 24 which may take the form of a symmetrical bidirectional transistor comprises a base electrode 22 and at least two operating electrodes 26 and 28 in cooperative relation to the base electrode. By way of example, amplifier 24 may be of the transistor junction variety in which the operating electrodes 26 and 28 are connected with separate zones of semiconductor conductivity in junction relation to a base zone to which the base electrode 22 is connected. For purposes of illustrational convenience, a P–N–P type transistor action will be assumed for the amplifier 24.

In the following description of the present invention it will be assumed that the electrical characteristics of each of the operating electrodes with respect to the base is substantially the same whereby either of the operating electrodes may serve as emitter or collector depending upon the relative polarity each operating electrode holds with respect to the base electrode. Such a semiconductor amplifier is known in the art as a bidirectional symmetrical unit. Since, in a bidirectional transistor either of the operating electrodes may operate as an emitter or collector, it is appropriate to term the operating electrodes "comitters." It is in this sense that the term "comitters" will be used throughout this specification and claims. With this understanding, quotation marks will not be hereafter used presenting this term.

In accordance with the present invention, a load resistor 30 is connected between the comitters 26 and 28. The value selected for the resistor 30 and the benefits to be derived therefrom is the heart of the present invention and will be discussed in full, hereinafter.

The signal whose phase is to be compared with the standard timing signal is shown by way of example at 32. Although the signal 32, is for purposes of convenience, indicated as being sawtooth in waveform it will be understood that other signal wave forms could be utilized without departing from the spirit and scope of the present invention. The waveform 32 is indicated as being developed by sawtooth generator 34 which has a relatively low internal impedance compared to the path impedance defined by the comitters of the amplifier 24. Capacitor 35 is made sufficiently large to present very little impedance to the signal frequencies comprising the sawtooth 32. The sawtooth generator 34 may in turn be controlled or timed by an oscillator 36 whose operating frequency is adapted for control by a frequency control circuit 38. By way of example, the frequency control circuit may be of the conventional reactance tube variety as shown, for instance, on page 655 of the Radio Engineering Handbook by Terman, first edition 1943. Any error voltage developed across the load resistor 30, which may be indicative of a phase difference between signal 32 and the timing signal 20 is then applied through a low-pass filter 40 to the frequency control circuit 38.

As is well known in the art, if the error signal developed across the resistor 30 accurately depicts by its polarity and magnitude the sense of, and magnitude of, the phase difference between the waveform 32 and timing signal 20. The frequency control circuit 38 may be made to maintain a predetermined mode of synchronism between the waveform 32 and the timing signal 20.

Figure 2:
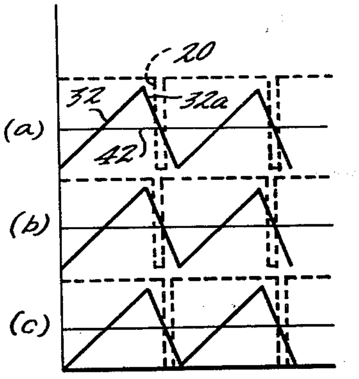
Figure 2 is a graphical illustration of exemplarly signal relationships which may be encountered in the practice of the present invention.

The circuit thus far described in Figure 1 is substantially the same as that shown in the above-referenced United States patent application by George C. Sziklai. Before considering the temperature correction influence provided by assigning a predetermined value to the load resistor 30, in accordance with the present invention, a general consideration of the operation of the Sziklai phase detector circuit will be helpful. As an aid in understanding the operation of Figure 1, reference to the graph of Figure 2 is desirable. Let it be assumed that it is desirable to maintain the waveform 32 and the timing signal pulses 20 in the synchronous relation shown in Figure 2*a*. The timing signal 20 as applied to the left hand terminal of capacitor 21 will tend to charge the capacitor 21 through the base of the amplifier 24 with a direction of current indicated by the arrow 44. The majority of this current may flow through either comitter depending upon the potential relationships of the comitter to one another and the base at the time of the pulse 20. The capacitor 21 will during the intervals between the pulses 20, be left with the charged condition illustrated in the figure, in which the base 22 of the amplifier 24 is left positively polarized with respect to circuit ground. If the amplitude of the timing signal 20 is made greater than the peak to peak amplitude of the waveform 32, it will follow that transistor type current conduction within the amplifier 24 cannot occur except during the pulses 20. Transistor action can occur during pulses 20 only by virtue of what appears as a forward bias current through the transistor due to the charging of capacitor 21 in the amount corresponding to whatever charge has leaked off during the period between successive pulses. If, during the "on" period of the amplifier corresponding to the individual pulses 20, the upper comitter 26 in response to the sawtooth signal 32, tends to swing positively with respect to circuit ground and comitter 28, the comitter 26 will act as an emitter and comitter 28 will act as a collector. This will act to charge the coupling capacitor 35 with its right hand terminal in a positive potential relation to its left hand terminal. This, of course, will leave the point 46 (or the comitter 26) with an average negative potential with respect to circuit ground. On the contrary, should the instantaneous potential of the right hand terminal of capacitor 35 be negative with respect to circuit ground during the "on" time of the amplifier 24, the capacitor 35 will tend to charge in an opposite polarity relation, with the comitter 26 acting as collector and the comitter 28 acting as emitter. Under such conditions, the average potential of the point 46 (or the comitter 26) will be positive with respect to circuit ground.

Returning now to the consideration of Figure 2*a* it will be evident that if the timing signal pulses 20 occur during the return or "flyback" portion 32*a* of the sawtooth 32 such that the intersection of the AC axis 42 with the return time slope 32*a* substantially bisects in the pulse 20, the average potential of the point 46 with respect to circuit ground will be substantially zero error voltage will be applied to the frequency control circuit defining the frequency of the oscillator 36. Should the phase of the oscillator 36 shift in a direction corresponding to a decrease in frequency, the waveform relation of Figure 2*b* will obtain. Under these conditions, it will be seen that the right hand terminal of capacitor 35 will be positive with respect to circuit ground during the "on" time of the amplifier 24, thereby resulting in a negative error voltage at terminal 46. This may be made to effect a temporary increase in the speed of the oscillator 36 to correct for this phase error. Should the oscillator 36 tend to speed up to produce the phase relation depicted by Figure 2*c*, a positive error voltage will be developed at terminal 46, thereby tending to slow down the oscillator 36. It is thereby seen that an automatic frequency control type of operation is provided by virtue of the basic phase detecting and comparing action of the circuit, involving the semiconductor amplifier device 24.

Figure 3:
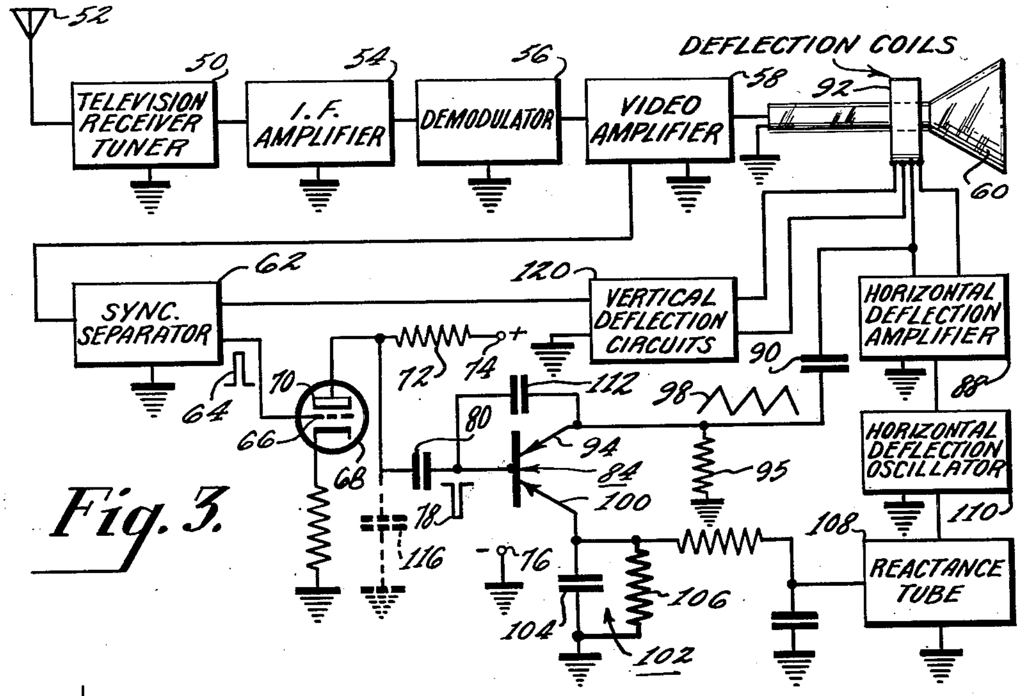
Figure 3 is a combination block and schematic diagram of a television receiver provided with an automatic frequency control circuit embodying the novel features of the present invention for controlling the cathode ray beam deflection rate of the receiver.

As brought out in copending United States patent application by Bernard Harris and Albert Macovski, Serial No. 420,240, filed April 1, 1954, entitled Phase Comparison System, the finite source impedance of the synchronizing pulses 20 causes the overall phase comparison circuit to be somewhat unbalanced in operation. The source impedance of the synchronizing pulses 20 may not only include the resistive component provided by the cathode impedance of the tube 14 in Figure 1, but also stray circuit-capacitance indicated by the dotted line capacitor 18. To correct for this, the above-identified Harris et al. U. S. patent application shows that a corrective or balancing impedance may be connected between the ungrounded comitter and base of the semiconductor amplifier as illustrated in Figure 1 and Figure 3. In Figure 1 a capacitor 48 in series connection with an associated resistor is connected between the comitter 26 and base 22 of the amplifier 24 for this purpose. In Figure 3 capacitor 112 serves the same balancing function. These aspects of the circuit shown in Figures 1 and 3 forms no part of the present invention and is itself fully claimed in the above-identified Harris et al. application.

In the practical employment of the arrangement in Figure 1, consideration must be given to the temperature responsive characteristics of known semiconductor amplifiers. It is common knowledge in the art that at the present state of development, semiconductor amplifiers of the transistor variety respond to temperature changes in a manner so as to decrease the reverse or "off" impedance existing between the operating electrodes such as 26 and 28 in Figure 1 as the ambient operating temperature of the amplifier device is increased. This has been attributed to the change in barrier conditions existing between the operating electrodes at the point where they are connected with the material forming the base element of the amplifier. In the embodiment of the invention shown in Figure 1 this means that if the resistor 30 forming the load between the comitters 26 and 28 of the bidirectional semiconductor amplifier 24 is made very high in value, the amount that the capacitor 35 will discharge between successive peaks of the sawtooth signal 32 will be a function of the reverse impedance between the comitters 26 and 28. This reverse impedance, of course, is of interest only during the "off" time of the amplifier 24, which corresponds to the interval between successive synchronizing pulses 20 as described above. If the value of the resistor 30 is made too low, insufficient voltage will be developed across the resistor in response to current flow between the comitters 26 and 28 to deliver a peak correction voltage to the filter 40 of sufficient magnitude to effectively operate the frequency control unit 38. In practice, it is found that most frequency control units (such as the well known reactance tube circuit) requires from three to five volts of control signal to produce a sufficient change in its operating characteristic to in turn adequately control the frequency of the oscillator or signal generator designated for control thereby.

In television deflection circuits, such as will be considered in the discussion of Figure 3, the magnitude of voltage delivered to the frequency control unit is a direct indicia of the pull-in range and speed of action of the overall automatic frequency control circuit. Thus, in accordance with the present invention, the value of resistor 30 is determined in terms of the duty cycle of the signal pulses 20, the voltage required across the resistor for AFC purposes and the desired peak current operating condition of the semiconductor amplifier 24. Where the duty cycle of the pulses 20 may be expressed as "D", the peak current to be passed by the transistor 24 in response to forward base current (representing the charging of capacitor 21 by the pulses 20) represented by "$i_p$," and the voltage it is desired to deliver to the filter network 40 is represented by "V", the value "R" of resistor 30 should be, in accordance with the present invention, no less than $$\frac{V}{Di_p}$$

The duty cycle "D" is to be expressed as the fraction of the whole repetition period of the signal pulses 20 which the amplifier 24 is actually rendered conducting. In instances where the back resistance between the comitters 26 and 28 is substantially higher, for example by a factor of three to five times the selected value of the resistor 30, temperature variations will not greatly affect the developed value of the control voltage applied to the filter network 40. In general, however, it is desirable to make the resistor 30 as low as possible consistent with the development of adequate AFC potential in response to the peak current capabilities of the amplifier 24.

By establishing the value of the load resistor 30, in accordance with the above teachings of the present invention, it has been found that relatively wide variations in ambient operating temperature can be tolerated by the circuit shown in Figure 1 (such as 30° F. to 130° F.) without excessively impairing the efficacy of circuit operation.

The embodiment of the present invention shown in Figure 3 is substantially the same as that shown in Figure 1, with the exception that the automatic frequency control circuit is shown in operating connection with the horizontal deflection circuit of a television receiver. Moreover, the polarity of the sawtooth signal employed in Figure 3 is opposite to that employed in Figure 1.

In Figure 3 a television receiver tuner 50 is shown adapted to receive radio signals from an antenna 52. Output signal from the tuner 50 is applied in a conventional manner to an intermediate frequency amplifier 54 which is in turn coupled to a signal demodulator 56. A video amplifier 58 is then fed by demodulated video signal provided by the demodulator 56. Output signal from the video amplifier 58 is applied to the kinescope 60 for modulation of the cathode ray beam therein. The demodulated video signal is also extracted from the video amplifier 58 and applied to a conventional form of sync separator circuit 62. Separated sync 64 is then applied to the control electrode 66 of a sync amplifier tube 68, whose anode 70 is connected through a load resistor 72 to a source of anode supply potential having a positive terminal at 74. The negative terminal of the anode supply source is shown grounded at 76. Negative going separated and amplified synchronizing signal 78 is capacitively coupled via the capacitor 80 to the base electrode 82 of a semiconductor type amplifier 84. The amplifier 84 is shown, purely by way of example, as being of the same general type as the amplifier 24 in Figure 1. A sawtooth deflection signal for comparing with the incoming sync may be conveniently derived from the output circuit of a horizontal deflection amplifier 88. To illustrate this a capacitor 90 is shown connected from one terminal of the horizontal deflection coil winding within the deflection yoke 92 to the comitter 94 of the amplifier 84. Sawtooth signal illustrated by the waveform 98 may be seen to be of an opposite polarity to that shown at 32 in Figure 1.

In the arrangement of Figure 3, in contradistinction to the circuitry of Figure 1, the comitter 100 of Figure 3 is connected with circuit ground through a time constant load circuit 102 comprising the capacitor 104 and resistor 106. The position of the circuit 102 applies a somewhat stabilized bias voltage to the comitter 100 and at the same time permits the developed bias to be used as a control voltage for the reactance tube circuit indicated at 108. The reactance tube 108 is in turn coupled with a horizontal deflection oscillator 110, which in a conventional manner, is directed to drive the horizontal deflection amplifier 88. An analysis of the circuit of Figure 3 will reveal that the sense of the correction voltage developed across the time constant network 102 is the same as that developed at point 46 for a given phase difference between the sawtooth signal 98 and the separated synchronizing signal 78, even though the sawtooth signal 98 is of opposite polarity to that used in Figure 1. As described above, the balancing capacitor 112 may be made to compensate for the finite source impedance of the synchronizing signal 78.

To achieve the temperature compensation effect of the present invention, in the arrangement of Figure 3, the value of resistor 106 is determined in accordance with the above considerations given in valuing resistor 30, illustrated in the embodiment of the invention shown in Figure 1.

Resistor 95 is connected from the comitter 94 to circuit ground to form a low impedance source of the sawtooth signal 98. In practice, the resistor 95 is made no greater than a few ohms so that its value may be considered negligible compared to the value determined for resistor 106, although actually forming a part of the load circuit between comitters 94 and 100. Assuming a standard type of television signal, such as is used in the United States, is being received by the arrangement of Figure 3, the duty cycle of the synchronizing pulses, having a recurrence frequency of 15,750 C. P. S. is about 1/20 of the recurrence period of these pulses. With an assumed peak current capacity for the semiconductor amplifier 84 of, for example, five milliamperes and a desired AFC voltage of five volts, the value of resistor 106 would in accordance with the criteria of the present invention set forth above be determined at 20,000 ohms. The semiconductor amplifier 84 upon being heated from 30° F. to 130° F. might display a change in back resistance between the comitters 94 and 100 from one megohm down to 50,000 ohms. With the resistor 106 valued at 20,000 ohms it can be seen that for normal temperature variations as might be encountered in home instrument television receivers, the voltage delivered to the reactance tube 108 would not change greatly as a function of temperature.

Purely by way of illustration, and with no intention of limiting the practice and scope of the present invention, the following exemplary circuit values are given for the embodiments of the present invention shown in Figures 1 and 3. Although the circuit values to be given have been found to give good results in the practical application of the present invention, to home type television receiving equipment it will be understood that other circuit values falling within the scope of the present invention, as described hereinabove and claimed more fully hereinafter, may be used with equally satisfactory results:

For convenience, condensers will be designated as "C" and resistors by "R," each followed by the index number assigned to such elements in the drawing.

IN FIGURE 1

*Amplifier 24.—A transistor type TA-211, selected for maximum symmetry*

| | | |
|---|---|---|
| C22 and C48 | μμf | 180 |
| C35 | μf | .05 |
| R30 | ohms | 20,000 |
| R47 | do | 100,000 |

IN FIGURE 3

*Amplifier 84.—A transistor type TA-211, selected for maximum symmetry*

| | | |
|---|---|---|
| C80 and C112 | μf | .01 |
| R72 | ohms | 50,000 |
| R114 | do | 20,000 |
| R95 | do | 10,000 |
| C90 | μf | .05 |
| C104 | μf | .05 |
| R106 | ohms | 20,000 |

What is claimed is:

1. In an electrical phase comparator circuit conditionally subject to wide ranges in ambient operating temperature the combination of: a first two terminal source of periodic electrical signals having a relatively low output impedance value; a second two terminal source of electrical signals whose phase relative to signals from said first source is to be compared; a semiconductor amplifier having a base electrode, a first operating electrode and a second operating electrode, said operating electrodes being cooperatively associated with said base electrode, said semiconductor amplifier having temperature response characteristics such that a cutoff output impedance is expressed between said operating electrodes during conditional periods of amplifier cutoff which is an inverse function of ambient operating temperature over a desired predetermined temperature range; a first capacitor connected between one terminal of said first signal source and said base electrode; a connection from the other terminal of said first signal source and said first operating electrode such that said first capacitor is charged by said first source of signals through forward input current to said base electrode thereby tending to produce transistor type conduction between said operating electrodes during said charging intervals, the magnitude of said signals from said first source, and the value of said capacitance means being adjusted to produce a net potential on said capacitance means of a value producing cutoff of said amplifier during periods between said charging intervals; a connection from said first operating electrode and one terminal of said second signal source; a second capacitor connected from the other terminal of said second signal source to said second operating electrode such as to conditionally charge said second capacitor from said second signal source to a predetermined voltage value upon an "on" conduction condition between said operating electrodes and resistance means connected between said first and second operating electrodes for developing an output signal indicative of the phase relation between said first and second signals, the value of said resistance means being substantially less than the lowest cutoff output impedance expressed between said operating electrodes over said desired predetermined temperature range.

2. In an electrical phase comparator circuit conditionally subject to wide ranges in ambient operating temperatures, the combination of: a first two terminal source of periodic electrical signals having a relatively low output impedance value; a second two terminal source of electrical signals whose phase relative to signals from said first source is to be compared; a semiconductor amplifier having a base electrode, a first operating electrode and a second operating electrode, said operating electrodes being cooperatively associated with said base electrode, said semiconductor amplifier having temperature response characteristics such that a cutoff output impedance is expressed between said operating electrodes during conditional periods of amplifier cutoff which is an inverse function of ambient operating temperature; a first capacitor connected between one terminal of said first signal source and said base electrode; a connection from the other terminal of said first signal source and said first operating electrode such that said first capacitor is charged by said first source of signals through forward input current to said base electrode thereby tending to produce transistor type conduction between said operating electrodes during said charging intervals, the magnitude of said signals from said first source and the value of said capacitance means being adjusted to produce a net potential on said capacitance means of a value producing cutoff of said amplifier during periods between said charging intervals; a connection from said first operating electrode and one terminal of said second signal source; a second capacitor connected from the other terminal of said second signal source to said second operating electrode such as to conditionally charge said second capacitor from said second signal source to a predetermined voltage value upon an "on" conduction condition between said operating electrodes; and resistance means connected between said first and second operating electrodes for developing an output signal indicative of the phase relation between said first and second signals, the value "R" of said resistance means is no less than the value substantially defined as follows:

$$R=\frac{V}{Di_p}$$

where "V" is the maximum predetermined voltage value to which it is desired to charge said second capacitor, "$i_p$" is the maximum peak current to be passed between said first and second operating electrodes and "D" is the fraction of the period of said first electrical signal during which said amplifier is rendered conductive by said first electrical signals.

3. In an electrical phase comparator circuit conditionally subject to wide ranges in ambient operating temperatures, the combination of: a first two terminal source of periodic electrical signals having a relatively low output impedance value; a second two terminal source of electrical signals whose phase relative to signals from said first source is to be compared; a semiconductor amplifier having a base electrode, a first operating electrode and a second operating electrode, said operating electrodes being cooperatively associated with said base electrode, said semiconductor amplifier having temperature response characteristics such that a cutoff output impedance is expressed between said operating electrodes during conditional periods of amplifier cutoff which is an inverse function of ambient operating temperature; a first capacitor connected between one terminal of said first signal source and said base electrode; a connection from the other terminal of said first signal source and said first operating electrode such that said first capacitor is charged by said first source of signals through forward input current to said base electrode thereby tending to produce transistor type conduction between said operating electrodes during said charging intervals, the magnitude of said signals from said first source and the value of said capacitance means being adjusted to produce a net potential on said capacitance means of a value producing cutoff of said amplifier during periods between said charging intervals; a connection from said first operating electrode and one terminal of said second signal source; a second capacitor connected from the other terminal of said second signal source to said second operating electrode such as to conditionally charge said second capacitor from said second signal source to a predetermined voltage value upon an "on" conduction condition between said operating electrodes; and resistance means connected between said first and second operating electrodes for developing an output signal indicative of the phase relation between said first and second signals, the value of said resistance means being substantially less than the lowest value of cutoff output impedance expressed between said operating electrodes but no less than the value substantially defined as follows:

$$R=\frac{V}{Di_p}$$

where "V" is the maximum predetermined voltage value to which it is desired to charge said second capacitor, "$i_p$" is the maximum peak current to be passed between said first and second operating electrodes and "D" is the fraction of the period of said first electrical signal during which said amplifier is rendered conductive by said first electrical signals.

4. In a keyed semiconductor amplifier circuit conditionally subject to wide variations in ambient operating temperatures, the combination of: a semiconductor amplifier having a base electrode and a first and a second operating electrodes cooperatively associated with said base, said semiconductor amplifier having temperature response characteristics such that a cutoff output impedance is expressed between said operating electrodes during conditional periods of amplifier cutoff which is a function of ambient operating temperature; means including a first source of periodically recurrent keying signals connected between said base and said first operating electrode for periodically keying the mode of said amplifier between a cutoff condition and an operative condition; a second source of periodically recurrent electrode signals; means including the serial connection of a capacitor coupling said second source of signals between said amplifier first and second operating electrodes so as to conditionally charge said capacitor from said second signal source upon being keyed into an operative condition by said keying signals it being desired to charge said capacitor to a predetermined voltage value; and a resistor connected between said first and second operating electrodes, the value "R" of said resistor being no less than the value substantially defined as follows:

$$R=\frac{V}{Di_p}$$

where "V" is the maximum predetermined voltage value to which it is desired to charge said second capacitor, "$i_p$" is the maximum peak current to be passed between said first and second operating electrodes and "D" is the fraction of the period of said first electrical signal during which said amplifier is rendered conductive by said first electrical signals.

5. In a keyed semiconductor amplifier circuit conditionally subject to wide variations in ambient operating temperatures, the combination of: a semiconductor amplifier having a base electrode and a first and a second operating electrodes cooperatively associated with said base, said semiconductor amplifier having temperature response characteristics such that a cutoff output impedance is expressed between said operating electrodes during conditional periods of amplifier cutoff which is a function of ambient operating temperature; means including a first source of periodically recurrent keying signals connected between said base and said first operating electrode for periodically keying the mode of said amplifier between a cutoff condition and an operative condition; a second source of periodically recurrent electrical signals; means including the serial connection of a capacitor coupling said second source of signals between said amplifier first and second operating electrodes so as to conditionally charge said capacitor from said second signal source upon being keyed into an operative condition by said keying signals it being desired to charge said capacitor to a predetermined voltage value; and a resistor connected between said first and second operating electrodes, the value of said resistance means being substantially less than the lowest value of cutoff output impedance expressed between said operating electrodes but no less than the value substantially defined as follows:

$$R=\frac{V}{Di_p}$$

where "V" is the maximum predetermined voltage value to which it is desired to charge said second capacitor, "$i_p$" is the maximum peak current to be passed between said first and second operating electrodes and "D" is the fraction of the period of said first electrical signal during which said amplifier is rendered conductive by said first electrical signals.

References Cited in the file of this patent

UNITED STATES PATENTS

| | | |
|---|---|---|
| 2,533,001 | Eberhard | Dec. 5, 1950 |
| 2,644,893 | Gehman | July 7, 1953 |

OTHER REFERENCES

Proceedings of I. R. E., June 1953, pages 713–714, "A Study of Transistor Circuits for Television," by Sziklai et al. (Copy in Patent Office Library.)